(12) United States Patent
Lymberopoulos et al.

(10) Patent No.: US 9,785,661 B2
(45) Date of Patent: Oct. 10, 2017

(54) TREND RESPONSE MANAGEMENT

(71) Applicant: Microsoft Technology Licensing, LLC, Redmond, WA (US)

(72) Inventors: Dimitrios Lymberopoulos, Redmond, WA (US); Oriana Riva, Redmond, WA (US); Karin Strauss, Seattle, WA (US); Doug Burger, Bellevue, WA (US); Gennady Pekhimenko, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 579 days.

(21) Appl. No.: 14/175,934

(22) Filed: Feb. 7, 2014

(65) Prior Publication Data
US 2015/0227517 A1   Aug. 13, 2015

(51) Int. Cl.
*G06F 17/30*   (2006.01)

(52) U.S. Cl.
CPC .... *G06F 17/3033* (2013.01); *G06F 17/30132* (2013.01); *G06F 17/30864* (2013.01); *G06F 17/30902* (2013.01)

(58) Field of Classification Search
CPC ......... G06F 17/30864; G06F 17/30991; G06F 17/30861; G06F 17/30312; G06F 17/30902; G06F 17/30905; G06F 9/542
USPC .......................................... 707/722, 706, 740
See application file for complete search history.

(56) References Cited

U.S. PATENT DOCUMENTS

| | | |
|---|---|---|
| 6,016,520 A | 1/2000 | Facq et al. |
| 6,055,515 A | 4/2000 | Consentino et al. |
| 6,085,187 A | 7/2000 | Carter et al. |
| 7,013,289 B2 | 3/2006 | Horn |
| 7,548,915 B2 | 6/2009 | Ramer et al. |
| 7,562,076 B2 | 7/2009 | Kapur |
| 7,613,690 B2 | 11/2009 | Chowdhury et al. |
| 8,176,046 B2 | 5/2012 | Druzgalski et al. |
| 8,370,380 B1 | 2/2013 | Kuraoka et al. |
| 8,943,043 B2 | 1/2015 | Lymberopoulos et al. |
| 2002/0147724 A1* | 10/2002 | Fries ................ G06F 17/30864 |
| 2003/0225885 A1 | 12/2003 | Rochberger |
| 2006/0002320 A1 | 1/2006 | Costa-Requena |
| 2007/0061244 A1 | 3/2007 | Ramer et al. |
| 2007/0094247 A1* | 4/2007 | Chowdhury ...... G06F 17/30864 |
| 2007/0100650 A1 | 5/2007 | Ramer et al. |
| 2007/0143255 A1 | 6/2007 | Mathur et al. |
| 2007/0214131 A1 | 9/2007 | Cucerzan |

(Continued)

FOREIGN PATENT DOCUMENTS

WO   2011090771 A2   7/2011

OTHER PUBLICATIONS

Second Written Opinion mailed Jan. 18, 2016 from PCT Patent Application No. PCT/US2015/014022, 7 Pages.

(Continued)

*Primary Examiner* — Robert Beausoliel, Jr.
*Assistant Examiner* — Pedro J Santos
(74) *Attorney, Agent, or Firm* — Rainier Patents, P.S.

(57) ABSTRACT

This document relates to trend response management. One example can detect a trending topic and identify content associated with the trending topic. The example can take an action relating to the content that decreases a trend-induced processing spike and/or enhances a user search experience associated with the trending topic.

20 Claims, 5 Drawing Sheets

(56) References Cited

U.S. PATENT DOCUMENTS

| | | |
|---|---|---|
| 2008/0005695 A1 | 1/2008 | Ozzie et al. |
| 2008/0071776 A1 | 3/2008 | Cho et al. |
| 2008/0071988 A1 | 3/2008 | Schloter |
| 2008/0207182 A1 | 8/2008 | Maharajh et al. |
| 2008/0235209 A1* | 9/2008 | Rathod ............ G06F 17/30864 |
| 2008/0243776 A1 | 10/2008 | Brunner |
| 2008/0270379 A1 | 10/2008 | Ramakrishna |
| 2009/0112975 A1 | 4/2009 | Beckman et al. |
| 2009/0287684 A1 | 11/2009 | Bennett |
| 2011/0258148 A1* | 10/2011 | Gao .................. G06F 17/30867 706/12 |
| 2012/0030018 A1* | 2/2012 | Passmore .......... G06F 17/30702 705/14.52 |
| 2012/0109966 A1* | 5/2012 | Liang ................ G06F 17/30643 707/740 |
| 2012/0166438 A1* | 6/2012 | Wu ..................... G06F 17/3064 707/737 |
| 2012/0254188 A1* | 10/2012 | Koperski .......... G06F 17/30663 707/740 |
| 2012/0271829 A1 | 10/2012 | Jason |
| 2013/0110823 A1 | 5/2013 | Su et al. |
| 2013/0159505 A1 | 6/2013 | Mason et al. |
| 2013/0275453 A1 | 10/2013 | Vyas et al. |
| 2015/0199439 A1* | 7/2015 | Hahn ................ G06F 17/30867 707/748 |

OTHER PUBLICATIONS

"Mobile Local Search Ad Revenues to Reach $1.3B by 2013", The Kelsey Group's Mobile Local Media Forecast (2008-2013), Feb. 25, 2009, retrieved at <<http://www.marketingcharts.com/interactive/mobile-local-search-ad-revenues-to-reach-13b-by-2013>>, pp. 1-2, 2 pages.

"Monsoon Solutions", retrieved at <<http://www.msoon.com/LabEquipment/PowerMonitor>> on Jan. 22, 2010, 1 page.

"Sony Ericsson Xperia X1 Mobile Phone", retrieved at <<http://www.sonyericsson.com/x1>> on Jan. 22, 2010, pp. 1-2, 2 pages.

Agarwal, Sachin, "Intelligent Content Caching for Mobile Devices", Proceedings of The 13th International Conference on Telecommunications, May 9-12, 2006, 4 pages.

Balasubramanian et al., "Enhancing Interactive Web Applications in Hybrid Networks", Proceedings of the 14th ACM International Conference on Mobile Computing and Networking, Sep. 14-19, 2008, 11 pages.

Church et al., "A Large Scale Study of European Mobile Search Behaviour", Proceedings of the 10th International Conference on Human Computer Interaction with Mobile Devices and Services, Sep. 2-5, 2008, pp. 13-22, 10 pages.

Church et al., "Mobile Information Access: A Study of Emerging Search Behavior on the Mobile Internet", ACM Transactions on the Web, vol. 1, No. 1, Article 4, May 2007, pp. 1-38, 38 pages.

Guha et al., "Serving Ads from localhost for Performance, Privacy, and Profit", Proceedings of Hot Topics in Networking (HotNets), Oct. 2009, 6 pages.

Hopfner, Hagen and Kai-Uwe Sattler, "Towards Trie-Based Query Caching in Mobile DBS", retrieved at <<http://subs.emis.de/LNI/Proceedings/Proceedings43/GI-Proceedings.43-11.pdf>>, pp. 106-121, 16 pages.

Hosseini, Mehdi and Hassan Abolhassani, "Mining Search Engine Query Log for Evaluating Content and Structure of a Web Site", 2007 IEEE/WIC/ACM International Conference on Web Intelligence, 7 pages.

Pitkow et al., "Mining Longest Repeating Subsequences to Predict World Wide Web Surfing", Proceedings of USITS'99: The 2nd USENIX Symposium on Internet Technologies & Systems, Oct. 11-14, 1999, 13 pages.

Kamvar, Maryam and Shumeet Baluja, "Query Suggestions for Mobile Search: Understanding Usage Patterns", CHI 2008, Apr. 5-10, 2008, 4 pages.

Kamvar, Maryam and Shumeet Baluja, "The Role of Context in Query Input: Using Contextual Signals to Complete Queries on Mobile Devices", Proceedings of the 9th International Conference on Human Computer Interaction with Mobile Devices and Services, Sep. 9-12, 2007, 8 pages.

Ku et al., "Location-Based Spatial Query Processing in Wireless Broadcast Environments", IEEE Transactions on Mobile Computing, vol. 7, No. 6, Jun. 2008, 14 pages.

Ozcan et al., "Space Efficient Caching of Query Results in Search Engines", 2008 IEEE, 6 pages.

Padmanabhan, Venkata and Jeffrey Mogul, "Using Predictive Prefetching to Improve World Wide Web Latency", ACM SIGCOMM Computer Communication Review, vol. 26, No. 3, Jul. 1996, 15 pages.

Said et al., "Data Prefetching Algorithm in Mobile Environments", European Journal of Scientific Research, vol. 28, No. 3, 2009, pp. 478-491, 14 pages.

Sorrel, Charlie, "Two Terabyte SD Cards Coming Soon", Gadget Lab, Hardware News and Review, Jan. 12, 2009, 1 page.

Teevan et al., "Information Re-Retrieval: Repeat Queries in Yahoo's Logs", Proceedings of the 30th Annual International ACM SIGIR Conference on Research and Development in Information Retrieval 2007, Jul. 23-27, 2007, pp. 151-158, 8 pages.

Teevan et al., "Personalizing Search via Automated Analysis of Interests and Activities", Proceedings of the 28th Annual International ACM SIGIR Conference on Research and Development in Information Retrieval 2005, Aug. 15-19, 2005, 8 pages.

Yi et al., "Deciphering Mobile Search Patterns: A Study of Yahoo! Mobile Search Queries", WWW 2008, Apr. 21-25, 2008, pp. 257-266, 10 pages.

Non-Final Office Action mailed Nov. 10, 2011 from U.S. Appl. No. 12/692,626, 15 pages.

Response mailed Feb. 7, 2012 to the Non-Final Office Action mailed Nov. 10, 2011 from U.S. Appl. No. 12/692,626, 23 pages.

Applicant-Initiated Interview Summary mailed Feb. 9, 2012 from U.S. Appl. No. 12/692,626, 3 pages.

Final Office Action mailed Apr. 19, 2012 from U.S. Appl. No. 12/692,626, 21 pages.

Response filed Sep. 19, 2012 to the Final Office Action mailed Apr. 19, 2012 from U.S. Appl. No. 12/692,626, 19 pages.

Non-Final Office Action mailed Jul. 18, 2013 from U.S. Appl. No. 12/692,626, 18 pages.

Applicant-Initiated Interview Summary mailed Oct. 4, 2013 from U.S. Appl. No. 12/692,626, 3 pages.

Response filed Oct. 25, 2013 to the Non-Final Office Action mailed Jul. 18, 2013 from U.S. Appl. No. 12/692,626, 20 pages.

Final Office Action mailed Jan. 29, 2014 from U.S. Appl. No. 12/692,626, 29 pages.

Response filed Apr. 28, 2014 to the Final Office Action mailed Jan. 29, 2014 from U.S. Appl. No. 12/692,626, 19 pages.

Notice of Allowance mailed Oct. 3, 2014 from U.S. Appl. No. 12/692,626, 7 pages.

International Search Report and Written Opinion mailed Sep. 19, 2011 from PCT Patent Application No. PCT/US2010/062661, 7 pages.

International Preliminary Report on Patentability mailed Aug. 2, 2012 from PCT Patent Application No. PCT/US2010/062661, 5 pages.

First Office Action mailed Jan. 14, 2013 from China Patent Application No. 201080062104.5, 12 pages.

Response filed May 24, 2013 to the First Office Action mailed Jan. 14, 2013 from China Patent Application No. 201080062104.5, 20 pages.

Decision on Rejection mailed Jun. 25, 2013 from China Patent Application No. 201080062104.5, 9 pages.

Request for Reexamination filed Aug. 28, 2013 from China Patent Application No. 201080062104.5, 18 pages.

Decision on Reexamination mailed May 30, 2014 from China Patent Application No. 201080062104.5, 16 pages.

Second Office Action mailed Jul. 3, 2014 from China Patent Application No. 201080062104.5, 12 pages.

(56) References Cited

OTHER PUBLICATIONS

Response filed Sep. 18, 2014 to the Second Office Action mailed Jul. 3, 2014 from China Patent Application No. 201080062104.5, 23 pages.
Third Office Action mailed Nov. 24, 2014 from China Patent Application No. 201080062104.5, 6 pages.
Response filed Feb. 9, 2015 to the Third Office Action mailed Nov. 24, 2014 from China Patent Application No. 201080062104.5, 16 pages.
Notice of Allowance mailed May 6, 2015 from from China Patent Application No. 201080062104.5, 9 pages.
International Preliminary Report on Patentability mailed May 18, 2016 from PCT Patent Application No. PCT/US2015/014022, 8 pages.
PCT Demand for International Preliminary Examination (Charpter II) and Response filed Aug. 26, 2015 from PCT Patent Application No. PCT/US2015/014022, 19 pages.
"International Search Report and Written Opinion," Mailed May 12, 2015, From PCT Patent Application No. PCT/US2015/014022, 10 Pages.
Mohan et al., "Prefetching Mobile Ads: Can Advertising Systems Afford It?", In Proceedings of the 8th ACM European Conference on Computer Systems, Apr. 15, 2013, 14 pages.
Nanopoulos et al., "A Data Mining Algorithm for Generalized Web Prefetching", In Proceedings of the IEEE Transactions on Knowledge and Data Engineering, vol. 15, Issue 5, Sep. 2003, 15 pages.
Narayanan et al., "Everest: Scaling Down Peak Loads through I/O off-loading", In Proceedings of the 8th USENIX Conference on Operating Systems Design and Implementation, Dec. 8, 2008, 14 pages.
"Bzip2", Published on: Sep. 20, 2010, Available at: http://www.bzip.org/, 1 page.
Vasudevan et al., "Safe and Effective Fine-grained TCP Retransmissions for Datacenter Communication", In Proceedings of the ACM SIGCOMM Conference on Data Communication, Aug. 17, 2009, 12 pages.
Wang et al., "How Far Can Client-Only Solutions Go for Mobile Browser Speed?", In Proceedings of the 21st International Conference on World Wide Web, Apr. 16, 2012, 10 pages.
Xie et al., "Locality in Search Engine Queries and Its Implications for Caching", In Proceedings of the IEEE Computer and Communications Societies Twenty-First Annual Joint Conference, vol. 3, Jun. 23, 2002, 10 pages.
Yin et al., "Adaptive Power-Aware Prefetch in Wireless Networks", In Proceedings of the IEEE Transactions on Wireless Communications, vol. 3, Issue 5, Sep. 2004, 11 pages.
Ziv et, al., "A Universal Algorithm for Sequential Data Compression", In Proceedings of the Journal of IEEE Transactions on Information Theory, vol. 23, Issue 3, May 1977, 7 pages.
Baeza-Yates et al., "A Three Level Search Engine Index Based in Query Log Distribution," In Proc. of the 10th String Processing and Information Retrieval Symposium, vol. 2857 of LNCS, pp. 56-65, 2003.
Spark, David, "Real-Time Search and Discovery of the Social Web", In Spark Media Solutions Report, Dec. 2009, 20 pages.
"Google Annual Search Statistics", Published on: Jun. 18, 2013, Available at: http://www.statisticbrain.com/google-searches, 3 pages.
"More Than One-Quarter of Organic Search Visits Came From Mobile Devices in Q2", Published on: Jul. 11, 2013, Available at: http://www.marketingcharts.com/wp/direct/more-than-a-quarter-of-organic-search-visits-came-from-mobile-devices-in-q2-34932, 5 pages.
Alizadeh et al.,"Data Center TCP (DCTCP)", In Proceedings of the ACM SIGCOMM Conference, Aug. 30, 2010, 12 pages.
Armstrong et al., "Efficient and Transparent Dynamic Content Updates for Mobile Clients", In Proceedings of the 4th International Conference on Mobile Systems, Applications and Services, Jun. 19, 2006, 13 pages.
Baeza-Yates et al.,"The Impact of Caching on Search Engines" In Proceedings of the 30th Annual International ACM SIGIR Conference on Research and Development in Information Retrieval, Jul. 23, 2007, pp. 8.
Baeza-Yates et al., "Admission Policies for Caches of Search Engine Results", In Proceedings of the 14th String Processing and Information Retrieval Symposium, Sep. 2007,12 pages.
Balasubramanian et al., "Energy Consumption in Mobile Phones: A Measurement Study and Implications for Network Applications", In Proceedings of the 9th ACM SIGCOMM Conference on Internet Measurement Conference, Nov. 4, 2009,14 pages.
Choi et al., "Predicting the Present with Google Trends", In Proceedings of in Economic Record, Jun. 27, 2012, 23 pages.
Fagni et al., "Boosting the Performance of Web Search Engines: Caching and Prefetching Query Results by Exploiting Historical Usage Data", In Proceedings of in Journal of ACM Transactions on Information Systems, vol. 24, Issue 1, Jan. 2006, 28 pages.
Falaki et al., "Diversity in Smartphone Usage", In Proceedings of the 8th International Conference on Mobile Systems, Applications, and Services, Jun. 15, 2010, 16 pages.
Greenberg et al., "VL2: A Scalable and Flexible Data Center Network", In Proceedings of the ACM SIGCOMM Conference on Data Communication, Aug. 17, 2009, 12 pages.
Kamvar et al., "A Large Scale Study of Wireless Search Behavior: Google Mobile Search", In Proceedings of the SIGCHI Conference on Human Factors in Computing Systems, Apr. 22, 2006, 9 pages.
Kamvar et al., "Deciphering Trends in Mobile Search", In Journal of Computer, vol. 40, Issue 8, Aug. 2007, 5 pages.
Kamvar et al., "Computers and iPhones and Mobile Phones, oh My! A Logs-based Comparison of Search Users on Different Devices", In Proceedings of the 18th International Conference on World Wide Web, Apr. 20, 2009, 10 pages.
Khalil et al., "Integrating Recommendation Models for Improved Web Page Prediction Accuracy", In Proceedings of the thirty-first Australasian Conference on Computer Science, vol. 74, Jan. 22, 2008,10 pages.
Komninos et al., "A Calendar Based Internet Content Pre-Caching Agent for Small Computing Devices", In Journal of Personal and Ubiquitous Computing, vol. 12, Issue 7, Oct. 2008,15 pages.
Koukoumidis et al., "Pocket Cloudlets", In Proceedings of in Sixteenth International Conference on Architectural Support for Programming Languages and Operating Systems, Mar. 5, 2011, 13 pages
Lempel et al., "Predictive Caching and Prefetching of Query Results in Search Engines", In Proceedings of the 12th International Conference on World Wide Web, May 20, 2003, 10 pages.
Lymberopoulos et al., "Pocket Web: Instant Web Browsing for Mobile Devices", In Proceedings of the Seventeenth International Conference on Architectural Support for Programming Languages and Operating Systems, Mar. 3, 2012, 12 pages.
Markatos et al., "A Top-10 Approach to Prefetching the Web", In Proceedings of in Technical Report 173, ICS-FORTH, Aug. 1996, pp. 9 pages.
Mathioudakis et al., "Twitter Monitor: Trend Detection Over the Twitter Stream", In Proceedings of Proceedings of the ACM SIGMOD International Conference on Management of Data, Jun. 6, 2010, 3 pages.
Communication pursuant to Rules 161(1) and 162 EPC mailed Sep. 14, 2016 from European Patent Application No. 15708920.2, 2 pages.
Response filed Oct. 20, 2016 to the Communication pursuant to Rules 161(1) and 162 EPC mailed Sep. 14, 2016 from European Patent Application No. 15708920.2, 11 pages.
Voluntary Amendment filed Feb. 3, 2017 from Chinese Patent Application No. 201580007578.2, 15 pages.

\* cited by examiner

TREND RESPONSE MANAGEMENT

BACKGROUND

Search portals like Google® and Yahoo® are among the top daily visited websites, indicating how crucial these services are to end users. In response to their popularity, search engine providers have put tremendous effort in optimizing their infrastructure, usually either through server-side or client-side caching, to enable the fastest possible search user experience.

Unfortunately, these optimizations can be rendered ineffective or costly due to the unpredictable nature of the search query volume. In particular, important events that take place in the physical world can instantly translate into significant, and often unpredictable, spikes in search requests. For instance, right after terrorist attacks, such as the 9/11 or more recently the Boston marathon bombing, users tend to search the web to get details about the events. Similarly, as other major 'trending' events, such as elections, are taking place, large numbers of users simultaneously search the web to get informed about the results. These search volume spikes, even though not happening daily, have significant impact on both the search backend and the mobile user experience.

First, datacenters are overprovisioned to sustain worst-case scenarios such as search volume spikes. The larger the search volume spikes, the higher the cost of overprovisioning (more active servers in the data center) or the higher the delay that end users experience. Server-side caching techniques can reduce the impact that each of these trending requests has on the datacenter, but they cannot prevent large numbers of requests from hitting the datacenter's front end. Second, in the presence of such unpredictable events, end users lose the benefit of real-time search experience delivered by previously proposed approaches for client-side search index caching. This negative impact is particularly crucial to mobile devices, equipped with energy consuming cellular links that are limited by lengthy connection setup times. As these devices are quickly settling to become the major entry point for accessing search services, the mobile experience delivered becomes a driving optimization factor for search engines.

SUMMARY

This document relates to trend response management. One example can detect a trending topic (e.g., event) and identify content associated with the trending topic. The example can take an action relating to the content that decreases a trend-induced processing spike and/or enhances a user search experience associated with the trending topic. For instance, the action can entail pushing the content to selected users, among other things.

Another example can include a display and storage configured to store computer-readable instructions. The example can also include a processor configured to execute the computer-readable instructions as follows. The example can receive a user search query and send the user search query to a remote service. The example can obtain a set of packets from the remote service that include results for the user search query and a dataset relating to a trending search topic. The user search query is unrelated to the trending search topic. The example can store the dataset on the storage. The example can receive a subsequent search query from the user relating to the trending search topic and retrieve search results for the subsequent search query relating to the trending topic from the dataset stored on the storage rather than sending the subsequent search query to the remote service. The example can present the search results for the subsequent search query on the display.

This Summary is provided to introduce a selection of concepts in a simplified form that are further described below in the Detailed Description. This Summary is not intended to identify key or essential aspects of the claimed subject matter, nor is it intended to be used as an aid in determining the scope of the claimed subject matter.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Trending search topics (e.g., events) can instantaneously increase the query load of a search engine's backend by as much as 30% or more. These unpredictable query load spikes stress both the search engine's backend as it has to be properly overprovisioned to sustain these peak loads, and the end-user search experience, particularly the mobile one, by introducing longer delays. Toward this end, consider introductory FIG. 1 which relates to a trend response management method or technique 100. In this case, the technique can detect a trending topic at 102. The trending topic can be thought of as a trending search query topic and the technique can detect the trending topic in real-time (e.g., before at least some users search for the tending topic).

Figure 1:
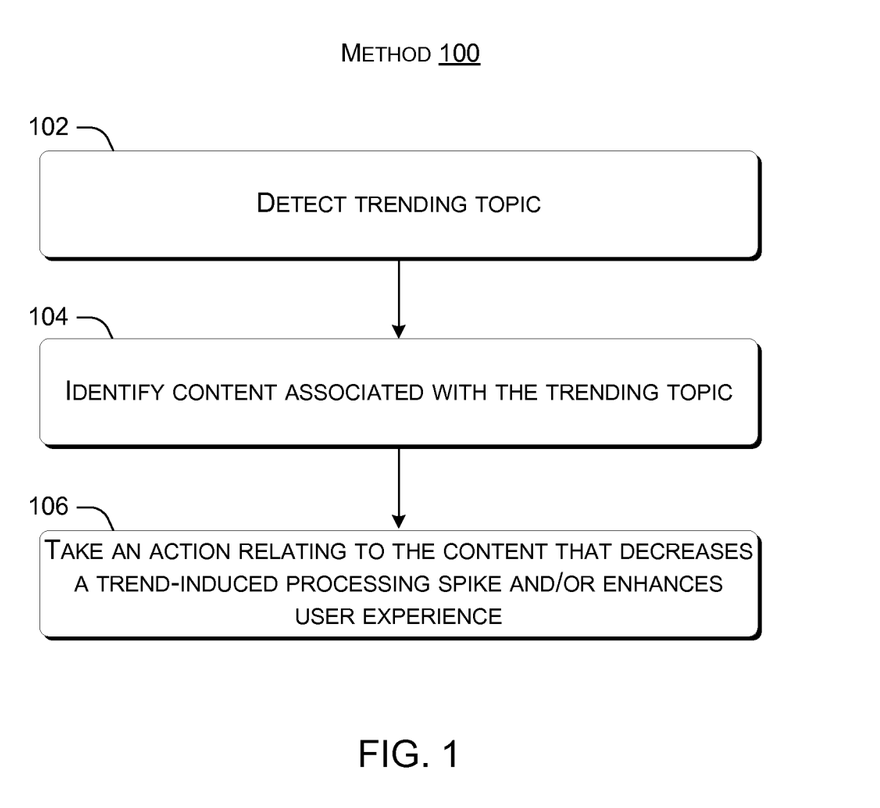
FIGS. 1 and 5 are flow diagrams of trend response management methods in accordance with some implementations.

The trend response management technique can identify content associated with the trending topic at 104. The content can relate to search queries, terms from search queries, search results, links in search results to web content, the web content, related content from social networks, and/or other search related content. The technique can take an action relating to the content at 106. The action can decrease a trend-induced processing spike at the search engine and/or enhance a user experience. For instance, the action can involve intelligently pushing the content to individual end users in a timely manner. In that way, some of the present implementations can enable a client-side search engine that can instantly answer user queries related to trending events, while at the same time reducing the impact of these trends on a search engine's backend workload.

Figure 2:
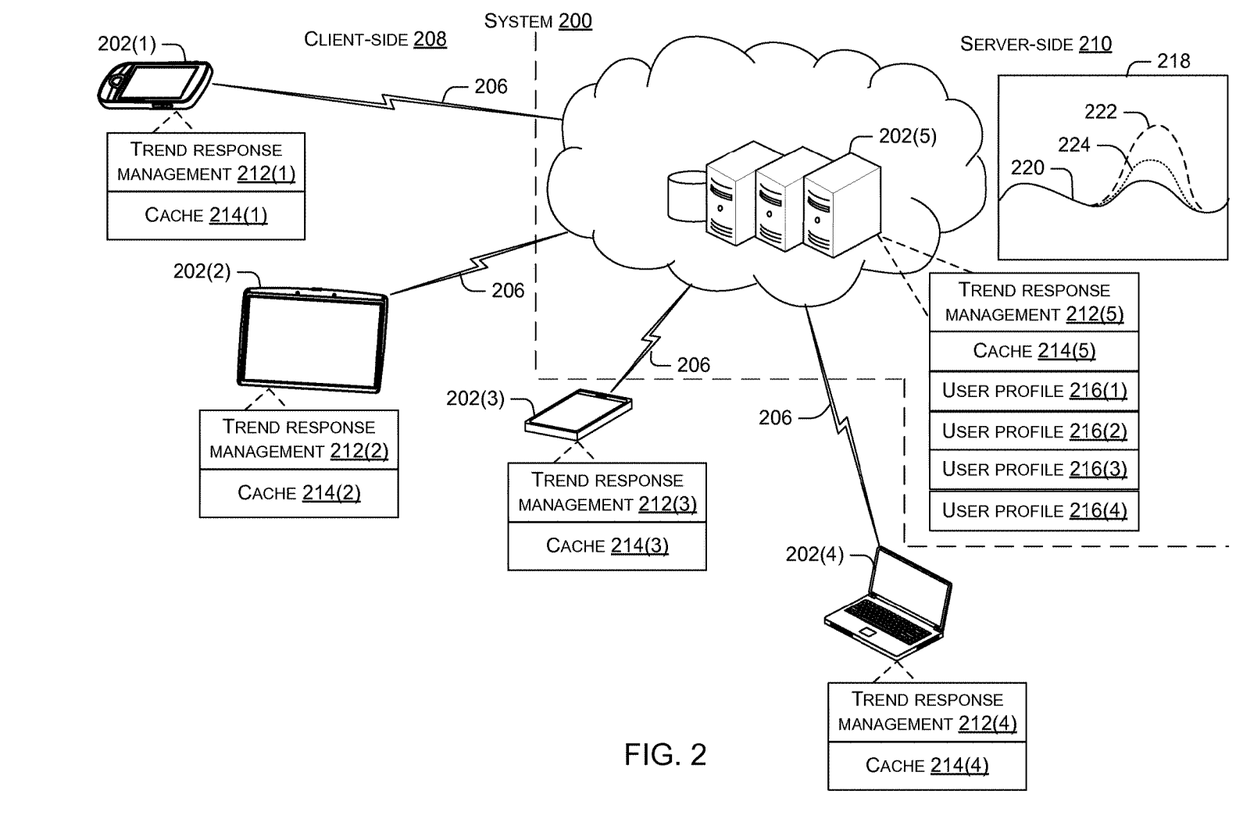
FIGS. 2-4 are examples of systems that can employ trend response management in accordance with some implementations of the present concepts.

FIG. 2 shows a system 200 that can accomplish trend response management. For purposes of explanation, system 200 includes four devices 202(1)-202(4) that can communicate with another device 202(5) that can provide a service, such as a search engine service. (The number of illustrated devices is, of course, intended to be representative and non-limiting). Devices 202(1)-202(4) can communicate with device 202(5) via one or more networks (represented by lightning bolts 206). In some cases parentheticals are utilized after a reference number to distinguish like elements. Use of the reference number without the associated parenthetical is generic to the element.

For purposes of explanation, devices 202(1)-202(4) can be thought of as operating on a client-side 208 (e.g., they are client-side devices). Device 202(5) can be thought of as operating on a server-side 210 (e.g. it is a server side device, such as in a datacenter or server farm). The server-side device can provide various remote functionalities, such as search functionalities, for the client-side devices. In this implementation, each device 202 can include an instance of a trend response management component 212. This is only one possible configuration and other implementations may include the server-side trend response management component 212(5) but eliminate the client-side trend response management components 212(1)-212(4), for example. In this case the devices 202 can also include a cache 214.

The system 200 may also maintain user-profiles 216 for the users of devices 202(1)-202(4). In this example, the user-profiles 216 are maintained on server-side device 202(5). (The user profile could alternatively or additionally be maintained on client-side devices.) User-profile 216(1) corresponds to the user of device 202(1), user-profile 216(2) corresponds to the user of device 202(2), and so on. The user-profile can contain information about what type of content the user is interested in (e.g., sports, computer science, movies, etc.), when the user tends to search (e.g., weekdays at 8:00 A.M., Noon, and 6:00 P.M.), location (e.g., time zone), social network information (e.g., social network identifier and list of close friends with related identifiers), whether the user has searched other trending events, etc.

System 200 also includes a hypothetical graph 218 that represents numbers of search queries on the vertical axis and time on the horizontal axis. Solid line 220 represents normal or background search query numbers. Dashed line 222 shows a temporary increase (e.g., spike) in search query numbers due to a trending topic that could occur without the present trend response management techniques (e.g., peak load query volume). Dotted line 224 shows how the present techniques can take actions to decrease the effects of the trending topic on the search query numbers (e.g., reduced peak load search query volume). For instance, in this implementation, the server-side trend response management component 212(5) can identify trending content and push this content to the caches of individual devices 202. Trend detection can be performed by a server-side device, such as device 202(5) or a different server-side device that is in communication with device 202(5).

The server-side trend response management component 212(5) can utilize various parameters to identify the individual devices to which to push the trending content. For instance, the parameters can include search engine resource costs, network bandwidth, device power state, device cache size, device location and time zone, and/or parameters from the user profile, among others. It is possible that pushing the trending content to all of the client-side devices 202(1)-202(4) could have search engine resource costs that outweigh any gains associated with the pushing. As such, the server-side trend response management component can select individual client-side devices to push the trending content to, when, and/or how to push the trending content.

For purposes of explanation, assume that the user of device 202(1) tends to be a relatively frequent (e.g., high volume) searcher and that the users of devices 202(2)-202(4) tend to be relative infrequent searchers. In this case, server-side trend response management component 212(5) may determine to push the content to device 202(1) based upon the likelihood that the user will subsequently search for the trending topic (e.g., active pushing). When the user actually submits a trend-related query the content is available locally to the user on device 202(1) for real-time use. Further, assume that after the trending topic is detected, an unrelated search query is received from device 202(3). In this case, the server-side trend response management component 212(5) may piggyback the trending content with results to the user's unrelated search query (e.g., passive pushing). This latter strategy has relatively low cost to the server-side device 202(5) and can offer the user instantaneous results from the local device cache if the user searches for the trending topic. Another strategy can be to update users based on their time zone (e.g., if a trending event is detected in Europe morning time, the trending content is pushed to devices in the U.S. with different delays so as to be available and most up to date when users wake up in different U.S. states).

To summarize, in some cases, intelligently pushing content can involve active and/or passive content pushing. For example, the content can be actively pushed to a subset of users that with high probability will search for the trending event. Alternatively, the content can be passively pushed to any user that reaches the search engine after a trending event has been detected and is still active. In that way, trend response management can address trending query volume spikes, without stressing even further the server-side device (e.g., search engine's backend). Discovering trends can be accomplished by starting with known techniques used in today's available products, such as Bing Trends™. The available trend products can be calibrated to detect the type of trends that can impact the overall search engine volume. Trend response management can leverage trend detection to enhance (and potentially optimize) both the datacenter workload and the end user search experience. Specifically, trend response management can automatically detect search content related to a trending event and efficiently push this content to users without significantly increasing the datacenter workload.

Figure 3:
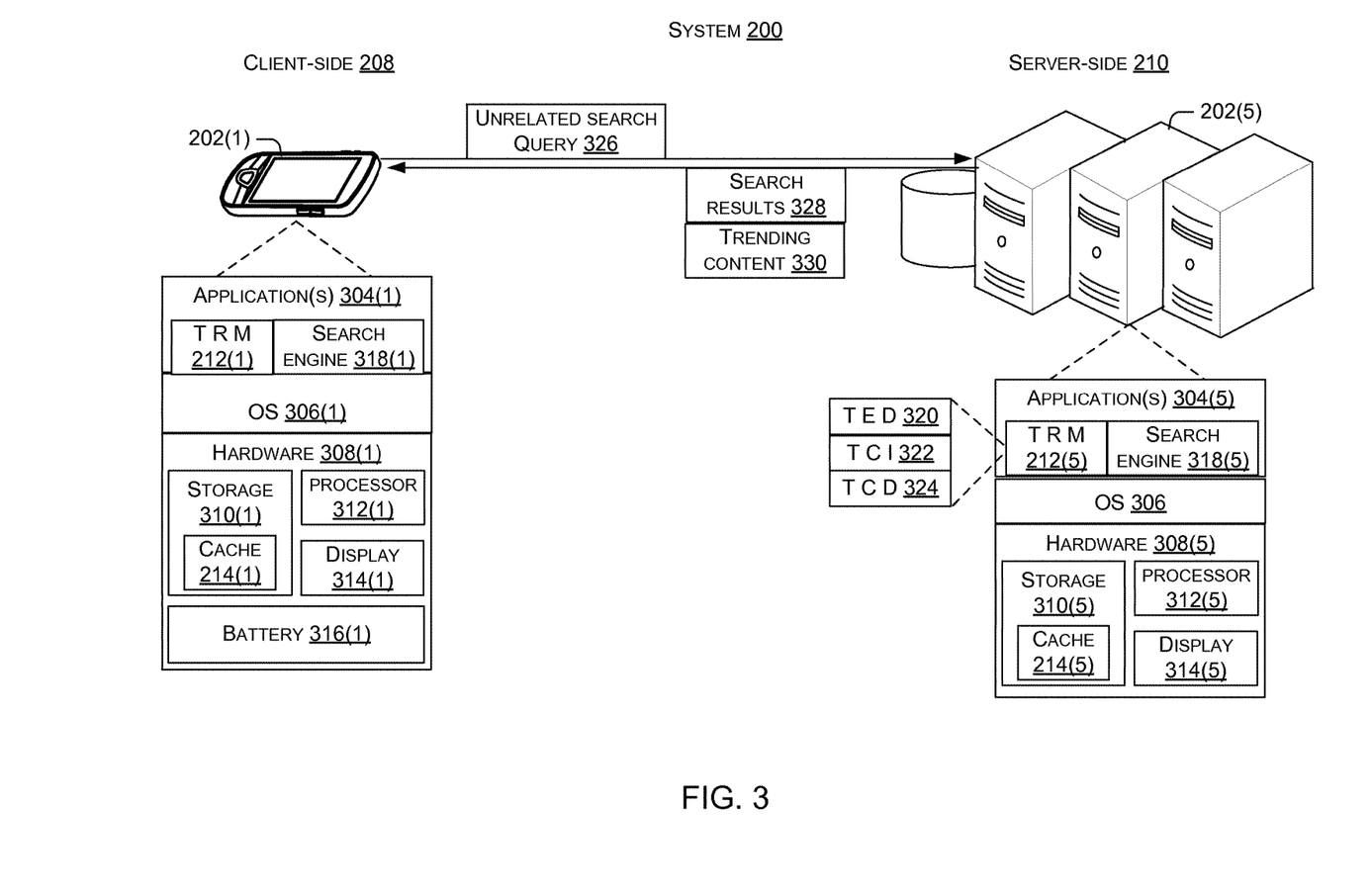

FIG. 3 shows additional details relating to components of client-side device 202(1) (representative of devices 202(1)-202(4)) and server-side device 202(5). Device 202 can support an application layer 304 running on an operating system (OS) layer 306. The operating system layer can interact with a hardware layer 308. Examples of hardware in the hardware layer can include storage media or storage 310, processor(s) 312, a display 314, and/or battery 316, among others. Storage 310 can include cache 214. Note that illustrated hardware components are not intended to be limiting and different device manifestations can have different hardware components.

Trend response management component 212 can function in cooperation with application(s) layer 304 and/or operating system layer 306. For instance, trend response management component 212 can be manifest as an application or an application part. In one such example, the trend response management component ("T R M" on FIG. 3) 212 can be an application part of (or work in cooperation with) a search engine application 318.

In some configurations, the trend response management component 212 and the search engine application 318 can function cooperatively as a web-content application and/or as part of a 'virtual assistant'. For instance, the cache stored locally on the client-side device can be leveraged in many different ways. First, search queries that the user submits through a dedicated search box or through the web browser on the client-side device can access this cache to instantly access user's queries. In addition, any application on the client-side device could take advantage of this cache. For instance, any search application the user utilizes for his/her searches could tap into the information in the cache. In addition, any application willing to show search results could first tap into the cache's content before hitting a traditional web search engine. Furthermore, dialogue systems such as virtual assistants helping users to easily get access to the right information, could also tap in to the contents of the cache to enable fast communication with the user.

The trend response management component 212 can include a trending event detection (T E D) module 320, a trending content identification (T C I) module 322, and a trending content delivery (T C D) module 324. Briefly, these modules can accomplish specific facets of trend response management. As their names imply, the trending event detection module 320 is involved in trend detection, the trending content identification module is involved in identifying content associated with the trend, and the trending content delivery module is involved in determining how to handle the trending content that is advantageous to the server-side device, individual client-side devices, and/or from a network bandwidth perspective. These modules are described in more detail below relative to FIG. 4.

From one perspective, device 202 can be thought of as a computer. Processor 312 can execute data in the form of computer-readable instructions to provide a functionality. Data, such as computer-readable instructions and/or user-related data, can be stored on storage 310, such as storage that can be internal or external to the computer. The storage can include any one or more of volatile or non-volatile memory, hard drives, flash storage devices, and/or optical storage devices (e.g., CDs, DVDs etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some configurations, device 202 can include a system on a chip (SOC) type design. In such a case, functionality provided by the computer can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPU), graphical processing units (CPUs), controllers, microcontrollers, processor cores, or other types of processing devices.

Generally, any of the functions described herein can be implemented using software, firmware, hardware (e.g., fixed-logic circuitry), manual processing, or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Note that unpredicted workload spikes are a reality for almost every single web service, and are not limited to search engines, such as search engine 318. As a result, there have been a lot of efforts to address these challenges directly at the networking level within datacenters. Datacenters deal with this type of problem through dynamic resource management and networking protocol optimizations. These techniques are complementary to the present trend response management techniques. Briefly, the present trend response management techniques can enable a system architecture at the application layer 304(5) capable of exploiting the semantics of the service, in this case search engine 318(5), for mitigating query load spikes.

Trend response management component 212(5) can be thought of as part of a new architecture for server-side services, such as search services that, in real time, can detect search query volume spikes due to trending events, identify the part of the search index associated to these events, and efficiently propagate it to end users in a timely manner. This system architecture can leverage two noteworthy observations. First, only a small number of search queries and search results are responsible for the majority of a trending event's query volume. Trend response management component 212(5) can leverage this observation to employ a two-step algorithm for identifying the small part of the search index that corresponds to the trending event, reducing the footprint of the data that is pushed to end users.

Second, there is a subset of users, from the hundreds of millions of search engine users that with high probability will search for a trending event in the future. In particular, frequent users that accessed the search engine 318(5) right before the trending event started are likely to search for the trending event in the future. As a result, trend response management component 212(5) can target updates towards high volume, recent users of the search engine 318(5). Furthermore, many users access the search engine 318(5) with queries unrelated to the trending event, after the trending event has been detected. Trend response management component 212(5) can leverage this finding to opportunistically update these users by piggybacking the trending search content along with the requested search results. For example, after the trend response management component 212(5) detects a trending topic, the user of device 202(1) could submit an unrelated search query 326. Search engine 318(5) can formulate search results 328 for the unrelated search query. The search results can be returned to device 202(1) with trending content 330 piggybacked with them (e.g., as a single communication that contains one or more packets). Stated another way, the search results can be returned to device 202(1) with trending content 330 piggybacked on the response to the unrelated search query (e.g., as a single response that contains one or more search results). This means that trending content can be pushed without requiring an extra client connection and an extra activation of the device's network radio (i.e., less energy consumed on the device).

The trending content 330 that was pushed to the user's device 202(1) can be stored on cache 214(1). Trend response management component 212(1) can work cooperatively with search engine 318(1) to provide a local client-side search engine that can provide instantaneous results. For instance, the trend response management component 212(1) can cause search engine 318(1) to check cache 214(1) for content before requesting remote services. For example, if the user enters a search query, such as a trending topic search query, the trend response management component 212(1) can cause search engine 318(1) to check cache 214(1) for the search results. If the content is in the cache, the search results can be provided instantaneously to the user. If not, the search engine can send the search query to the server-side 210 for execution.

To summarize, the local search engine 318(1) and the cached trending content (e.g., stored in cache 214(1)) can provide instantaneous answers to subsequent user queries related to the trending topics, while reducing the impact of these trends on the datacenter workload. Note that the role of trend response management component 212 is not to replace the search engine, but to rather work along with the search engine to enable faster (and potentially the fastest possible) search experience in a way that is transparent to users. Recall that when a user submits a query, trend response management component 212(1) on the user's device can be invoked to check if the cached trending content contains search results for the query, and, if true, the results can be instantly displayed. Otherwise, the query can be routed to the server-side 210. In a hybrid configuration, local results from the cache can be presented to the user while the server-side is queried for updates and/or additional information.

Trend response management can benefit any type of client-side device, however, client-side advantages may be more pronounced on mobile devices given that they tend to use wireless networks which can be slow and power-hungry on the device's battery 316(1). The network can also benefit from having trending content sent with other packets rather than as a subsequent distinct communication. In some configurations, the trend response management component 212(1) and search engine 318(1) can be thought of as a local application that is part web-browser, such that user queries can be answered locally if possible and if not, then remotely.

In summary, trend response management component 212 can accomplish several goals. Notable among these goals is a first goal to eliminate spikes in the server-side device 202(5)'s (e.g., search backend's) query volume due to trending topics, and therefore to reduce costly datacenter overprovisioning. A second notable goal is to deliver instant search experience for most (and/or all) of the queries related to a trending topic. Trend response management component 212 can achieve these goals by detecting trending search topics in real-time, identifying the search content associated to these topics, and timely propagating it to end users.

Note that the user's privacy can be protected while implementing the present concepts by only collecting user data upon the user giving his/her express consent. All privacy and security procedures can be implemented to safeguard the user. For instance, the user may provide an authorization (and/or define the conditions of the authorization) on his/her device or profile. Otherwise, user information is not gathered and functionalities can be offered to the user that do not utilize the user's personal information. Even when the user has given express consent the present implementations can offer advantages to the user while protecting the user's personal information, privacy, and security and limiting the scope of the use to the conditions of the authorization.

Figure 4:
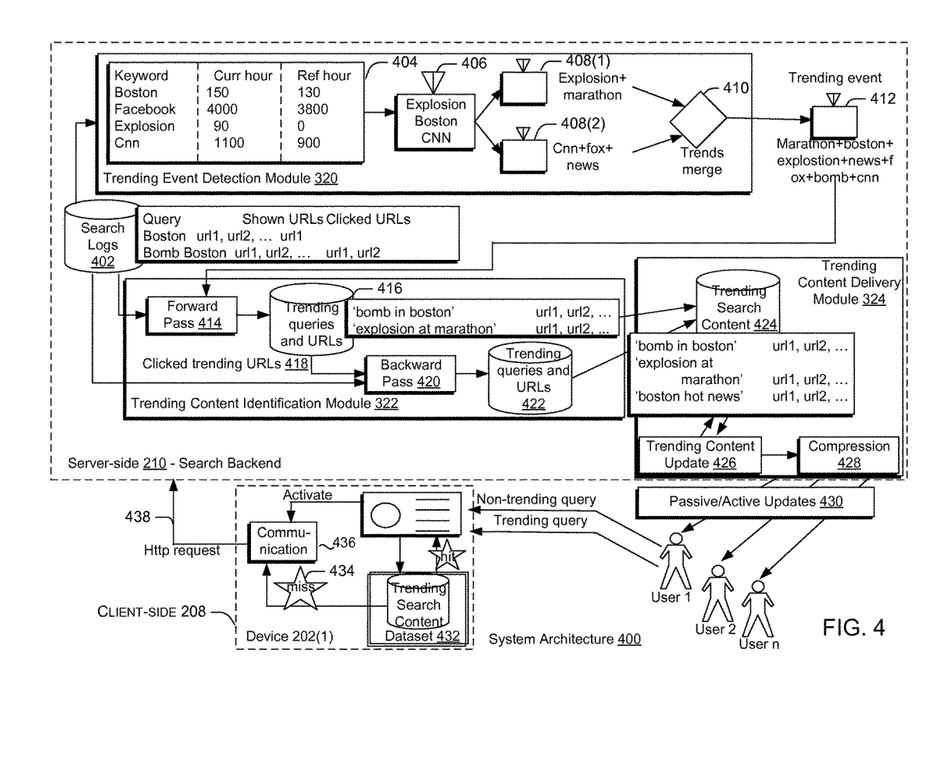

FIG. 4 shows a system architecture 400 that utilizes the elements introduced in FIGS. 2-3. In this case, the trend response management is accomplished on the server-side 210 (e.g., search backend). The trend response management can be accomplished by the trending event detection module 320, the trending content identification module 322, and the trending content delivery module 324. The elements of the system architecture 400 are introduced briefly in the paragraphs below. Subsequently, specific aspects are discussed in further detail. The system architecture is explained by way of an example relating to the real-life Boston Marathon Bombing tragedy, but of course applies to other trending events/topics.

Trending event detection module 320 can utilize various techniques to detect trends. In one case, the trending event detection module can implement a simple, yet efficient, trending algorithm on top of search logs 402 to detect all trending events in near real time. For instance, the trending event detection module 320 can analyze various sources, such as search logs 402, social media, Twitter, etc. The trending event detection module can identify keywords 404 from the search logs and/or other sources. The trending event detection module can detect trending keywords 406 by analyzing the frequency at which these keywords are utilized. In this example, two sets of trending keywords are identified at 408(1) and 408(2). One goal at this point is to detect keywords that are searched significantly more frequently than normal (e.g., five times more frequently than during the same hour the day before). The trending event detection module 320 can determine whether groups of trending keywords 408(1) and 408(2) belong to the same trending event. If so, the trending event detection module 320 can group the detected trending keywords together as indicated at 410 to form trending event 412. A trending event 412 at this stage is a collection of frequently searched co-occurring keywords.

Trending content identification module 322 can further process the trending event 412. At 414, the trending content identification module can make a forward pass that can scan the search logs 402 in light of the trending events 412 to identify tending content 416 that includes all queries that contain a significant number of trending keywords 406. The trending content identification module can mark these queries as trending. The trending content identification module can select a subset of these trending queries that has the highest search rates and the highest number of clicks at 418. Stated another way, the forward pass can identify search queries related to the trends and search results that were provided to the users and clicked by the users.

Likewise, at 420, the trending content identification module 322 can make a backwards pass 420 that can use the clicked search results produced in the forwards pass 414. The backwards pass can re-examine the search queries in the search logs 402 to identify other search queries that resulted in the user selecting (e.g., clicking) the search results identified in the forwards pass. The backwards pass can add these additional search queries to the trending content 416 to produce updated trending content 422. Stated another way, the forward pass can capture most of the relevant search queries and search results associated with the trending topic. The backwards pass can identify additional search queries that while not identified in the forward pass still relate to the trending topic as identified by the users clicking on the search results for the trending topic.

Thus, the trending content 416 and the updated trending content 422 both contribute to the trending search content 424. This subset can then be handled by the trending content delivery module 324 in a manner beneficial to the sever-side 210 and/or the client-side 208. For instance, this strategy can ensure that the most relevant trending search content will be propagated to users without wasting bandwidth and storage resources on users' devices. For example, the trending content delivery module 324 can push the trending search content 424 to individual client-side devices. This aspect is discussed in more detail below.

The trending event detection module 320 and the trending content identification module 322 can continuously run in the server-side search backend to detect trending events 412 and associated trending search content 424. The trending content delivery module 324 can determine when, how, and to whom to push trending content updates 426 derived from the trending search content 424 to individual end users actively or passively. The trending content delivery module 324 can configure the trending search content 424 and/or trending content updates 426 as a dataset 432 (illustrated relative to client-side) for the client devices. In the present implementation, the dataset 432 can be manifest as a hash table. Other dataset configurations, such as graphs, key-value stores, data tables, or any custom data representation can be utilized. The trending content delivery module 324 can utilize data compression at 428 to reduce the bandwidth consumed for pushing the dataset to individual users 1-n as passive and/or active updates 430. The updates 430 can be compressed forms of the dataset 432 and/or a sub-set of the dataset, such as update 426.

At the client-side 208, client devices 202 can store dataset 432. The dataset 432 can map or reference search queries to search results. When a user (e.g., user 1) submits a trending query or a non-trending query on his/her device 202(1), the local version of the trend response management component 212 (see FIG. 2) on the client device can compute the hash value for the query and check against the dataset 432. When no match is detected (e.g., miss 434), the local trend response management component 212 can automatically send the user query to the server-side 210 in the same way that search applications work today (e.g., via a communication component 436 (e.g., a radio)). The communication component can send the user query to the server-side as an http request (or other format) as indicated at 438.

In contrast, when the local trend response management component 212 detects a local match in the dataset 432, the matched query along with a number of the top search results can be instantly displayed to the user (e.g., user 1). The user can click on any of the search results or explicitly choose to submit this query to the server-side 210 for the latest search results. In that way, trend response management does not replace the search engine, but it rather works along with it to enable the fastest possible search experience for end users.

Returning to the trending event detection aspect for a more detailed discussion, the trending event detection module 320 can identify an initial set of trending keywords 406. The trending event detection module 320 can group the trending keywords 406 together to form trending events 412.

Under normal conditions an individual keyword tends to have generally consistent numbers of occurrences for comparable periods (e.g., 10:00 A.M. to 11:00 A.M. on concurrent days). Significantly higher numbers of occurrences, such as 5× to 10×, compared to a reference time and day can be indicative of a trend. Formally, in some implementations a keyword is defined to be frequent if $$\frac{Curr_{hour}}{Ref_{hour}} \geq KeywordRatioThreshold \qquad (1)$$

where $Curr_{hour}$ is the number of appearances for a keyword in the current hour, and $Ref_{hour}$ hour is the number of appearances for the same keyword in the same hour in a reference day.

KeywordRatioThreshold in formula 1 is an empirically-defined threshold that separates random, small frequency variations of keywords that can happen across days, from significant frequency variations that indicate a trending event. The present implementations are directed towards detecting major trending events that result into significant search volume spikes, so finding an appropriate value for KeywordRatioThreshold becomes trivial. Some implementations set the threshold at keywords appearing more than five times (for example) more frequently than usual as indicative of strong trending events causing search volume spikes.

Even though $Ref_{hour}$ in formula 1 has a non-zero value for most keywords, there are keywords that appear suddenly due to a trending event. For instance, keywords like "pope" during the 2013 pope election, and "explosion" during the Boston marathon bombing were completely new keywords ($Ref_{hour}$=0). To handle such cases, and to differentiate actual trending keywords 406 from random new keywords 404, a keyword with $Ref_{hour}$=0 becomes trending only if it is statistically important, in the sense that it is observed at least in 0.1% (for example) of all queries in the last hour.

After detecting the trending keywords 406, the trending event detection module 320 can evaluate the keywords for potential groupings. In essence, every trending keyword 406 can be a trending event 412 by itself. However, the detected trending keywords could belong to one or more trending events taking place at the same time. The trending event detection module can properly group keywords together to form trending events by examining how frequently trending keywords are searched together. Generally, the more often two keywords are searched together, the higher the probability they refer to the same topic. For example, for the Boston marathon bombing event the words "marathon" and "explosion" are searched together 93% of the time. Trending keywords that are searched together more than about 20% (for example) of the overall times they appear in the search logs tend to refer to the same trending event. As a result, the trending event detection module 320 can merge every pair of trending keywords that is searched together at least 20% of the times it appears in the logs to form a single trending event. For example, trending keywords 408(1) and 408(2) are grouped at 410 into trending event 412. The trending event detection module can also evaluate every new trending keyword against all the current trending keywords, and it either joins an active trending event or forms a new one.

The trending event detection module 320 does not necessarily treat the detected trending events as immediately active. The trending event detection module can treat them as active only, for example, when the overall percentage of queries in the last hour (or other time period) that contains at least one of the trending event's keywords is higher than a threshold. In one example the threshold is 1% (for instance). This threshold can ensure that content is pushed to users only for events that are large enough to have impact on both the datacenter and the end user.

At this point, a trending event 412 is a collection of trending keywords that are frequently searched together. Trending content identification module 322 can leverage this collection of keywords to identify the search content related to the trending event. Search content in this context can be defined as all the search queries related to the trending event and the search results associated to these queries. Detecting this content can be quite challenging for two reasons. First, device users search for a specific topic in multiple different ways due to either the large number of synonyms used, or the typos and grammatical errors (e.g., "boeton explo").

Second, queries that look very similar can semantically be very different. For instance, the queries: "boston marathon" and "boston marathon bombing" could be very different as the former is an informational query about the event, while the latter focuses on the bombing incident.

The trending content identification module 322 can use the forward pass 414 and the backward pass 420 to detect relevant queries. First, the forward pass of the search logs 402 can take place to identify a small set of queries that with high certainty are related to the trending event 412. Given this small set of highly relevant queries and the search results that users click on in response, the trending content identification module 322 can identify the core set of search results related to the trending event indicated as tending content at 416. At the second step, the backwards pass 420 of the search logs takes place where additional queries related to the trending event can be identified based on the set of search results identified in the first step. In particular, all queries that resulted in users clicking on a search result related to the trending event can be automatically treated as being related to the trending event. In that way, even infrequent and unconventional queries used to search for the trending event (e.g., "boston explode") can be captured.

Given that the goal of the forward pass 414 is to identify a small number of search queries that are relevant to the trending event with high probability, trending content identification module 322 can follow a conservative approach. In this implementation, all search queries in the past hour that contain three or more trending keywords are automatically assumed to be related to the trending event. Given the fact that users' queries, especially mobile users, tend to contain three/four or less keywords most of the time, three trending keywords can indicate a strong match. All search queries that contain zero or just one trending keyword can be ignored in this step, because even generic keywords such as "Boston", "cnn" or "news" can become trending. Search queries that contain exactly two trending keywords, the most common case in the mobile search logs, can be more complicated. For example, the queries "boston marathon results" and "explosion at boston today" contain exactly two trending keywords for the Boston marathon bombing event. However, the first query is most probably not related to the bombing, because the user cares about the marathon results, and not the bombing incident.

To handle these cases, trending content identification module 322 can implement a matching algorithm where different trending keywords are given different weights in the matching process depending on how unique they are. For example, the keyword "boston" can be used in many different queries (e.g., "boston weather"), and hence its uniqueness is lower than the keyword "explosion". Trending content identification module 322 can distinguish these two cases through the keyword frequency increase between the trending event's time period and a reference time period (formula 1). Keywords like "boston" usually have relatively low increase ratios (5×-8×), while keywords like "explosion" can have ratios over 100×.

Given this observation, trending content identification module 322 can compute a matching score Queryscore for every candidate search query:

$$Query_{score} = \frac{\Sigma_{Keyword-K_i InQuery} Uniqueness_{k_i} * Curr_{hour}^{k_i}}{\Sigma_{Keyword-K_j InQuery} Uniqueness_{k_j} * Curr_{hour}^{k_j}} \quad (2)$$

where Uniqueness$_k$ represents how unique keyword k is:

$$Uniqueness_k = \begin{cases} 1, & \text{if } 5 \geq \frac{Curr_{hour}^k}{Ref_{hour}^k} \leq 20 \\ 2, & \text{if } 20 < \frac{Curr_{hour}^k}{Ref_{hour}^k} \leq 50 \\ 3, & \text{if } 50 < \frac{Curr_{hour}^k}{Ref_{hour}^k} \leq 100 \\ 5, & \text{if } 100 < \frac{Curr_{hour}^k}{Ref_{hour}^k} \leq 1000 \\ 10, & \text{if } 1000 < \frac{Curr_{hour}^k}{Ref_{hour}^k} \end{cases} \quad (3)$$

Curr$_{hour}^k$ and Ref$_{hour}^k$ represent the number of queries in the past hour and in the reference hour respectively, that contained the trending keyword k. The higher the change in the appearance frequency of the keyword k in the search logs, the higher its uniqueness value. Note that the weight of a trending keyword (equation 2) takes into account both the uniqueness and absolute frequency of a keyword by multiplying them. For every query the trending content identification module 322 can find the query's matching weight as the total sum of the weights of all trending keywords that are contained in the query, normalized by the total weight of all available trending keywords. In that way, the matching score for a query is a value between 0 and 1. In one implementation, every query with a matching score higher than 0:5 can be assumed to match the trending event.

At the backward pass 420, trending content identification module 322 can record all the search results that users clicked on after submitting queries that have been identified as trending. Trending content identification module 322 can leverage these search results to identify additional queries that belong to the trending event. In particular, every query in the search logs that resulted in a click on one of the search results identified in the forward pass step is added to the trending event.

After the trending event has been detected, the trending content identification module 322 can identify a set of search queries associated to the event. By examining all the search results that users clicked after submitting these queries, the trending content identification module 322 can generate the final set of search results (uniform resource locator (URLs) and snippets) associated to the trending event as trending search content 424.

When considering every single query and search result associated to the event, the total number of queries and search results can be quite large. Pushing all this data to users, especially mobile users, tends to be undesirable due to the bandwidth requirements. However, the majority of the search traffic related to the trending event tends to be concentrated around a small set of these queries and corresponding search results (e.g., top 50 search results). As a result, trending search content module 424 can leverage the most popular 1000 (for example) trending search queries along with the corresponding search results to form the trending cache (e.g., dataset 432) that is pushed to users. This approach can ensure high (and potentially close to ideal) performance, while reducing (and potentially minimizing) the bandwidth consumed to get the compressed trending content updates to individual users 1-n.

After the trending search content has been identified, the trending search content module 424 can timely and efficiently propagate this content to individual users 1-n. Given the large number of search engine users, this can be prohibitively expensive in terms of bandwidth for the datacenter to accomplish. To minimize the impact that updating users can have on the search backend, the trending search content module 424 can employ various strategies. Two of these strategies are described below.

First, the trending search content module 424 can identify a subset of the search engine's users that with high probability will search for the trending topic in the future. For example, the trending search content module 424 can identify all users that submitted a query within two hours (or other time period) before the trending event took place, and can push the trending search content to these users in descending order of their query volume. To limit the effect of active updates on the search backend and its bandwidth consumption, the trending search content module 424 can enforce a maximum number of users to be updated every minute. In that way, the trending search content module 424 does not overwhelm the datacenter (e.g. server-side device) and/or the network by simultaneously pushing content to all users.

Second, based on the findings of the mobile search log analysis, the trending search content module 424 can complement active content pushing with passive user updates. A large percentage of users (up to 26%) submit queries unrelated to the trending event after the trending event has been detected. The trending search content module 424 can leverage this to opportunistically push the trending search content (e.g., dataset 432) to these users along with the search results for the unrelated search query. In that way, the trending search content module 424 can timely update users that might have never been updated through active updates, without increasing the datacenter's workload.

In summary, trend response management component 212 (introduced in FIGS. 2-3) can address four fundamental challenges: what trending search content to push, when to push it, whom to push it, and how to push it.

First, trend management techniques can automatically detect trending events in near real time, and at the same time identify the portion of the search index that is related to these events. This portion of the search index will become the actual search content (search queries and corresponding search results) that will be pushed to end users. The feasibility of this approach can in some instances depend on how concentrated the search content associated to a trending topic actually is. If users' clicks are evenly distributed over a large number of search results, then identifying the trending part of the search index can be quite difficult. Conversely, if most users click on a small number of search results when searching for trending topics, then the trending search content, including search queries and URLs in the results, is more compacted and therefore manageable.

Given the identified set of search queries and corresponding search results, trending search content module 424 still decides when to push this content to end users. Even though a trending event can be detected quite early (e.g., within 20 minutes, for example), the content related to the event might evolve over time, especially in the very beginning. Hence, pushing the trending data too early could be ineffective as crucial content might be missing.

To address the constant evolution of trending events, trend response management can continuously scan the search logs to identify the freshest trending search content, and push it to users. Every time a user is updated, the latest trending content can be used to satisfy the trend-related queries.

Example Techniques

Figure 5:
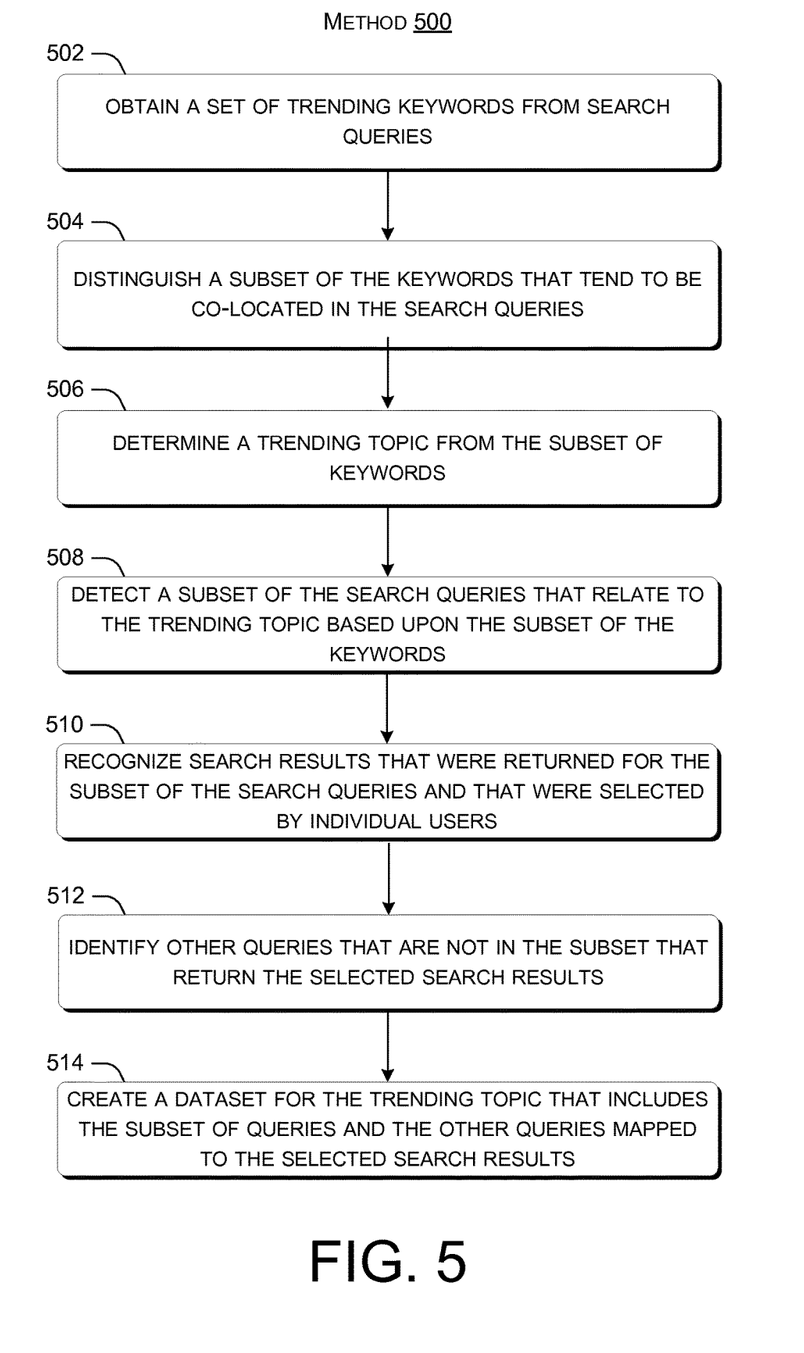

FIG. 5 illustrates a flowchart of a trending response management technique or method 500.

At block 502 the method can obtain a set of trending keywords from search queries.

At block 504 the method can distinguish a subset of the keywords that tend to be co-located in the search queries.

At block 506 the method can determine a trending topic from the subset of keywords.

At block 508 the method can detect a subset of the search queries that relate to the trending topic based upon the subset of the keywords.

At block 510 the method can recognize search results that were returned for the subset of the search queries and that were selected by individual users.

At block 512, the method can identify other queries that are not in the subset that return the selected search results.

At block 514, the method can create a dataset for the trending topic that includes the subset of queries and the other queries mapped to the selected search results. The dataset can be actively or passively sent to individual users. Further, individual users' profiles may be evaluated to determine whether he/she is likely to be interested in the trending topic. For example, a likelihood of interest can be determined. If the likelihood is over a threshold, then the user can be viewed as a strong candidate for active or passive pushing. If the likelihood is below the threshold, the user may be viewed as less likely to benefit from the trending content. Thus, the user profile can be treated as another source of information (e.g., another parameter) to consider when deciding whether to push the trending content to the user. Parameters can be considered of equal importance or some parameters can be weighted over others.

Trending response management techniques can determine which users 1-n to push trending search content, and in what order they will be updated with the detected trending search content. This is not a trivial task as commercial search engines have hundreds of millions of unique users. Attempting to simultaneously update every user with the trending search content will likely overwhelm the data center, creating a bigger problem than the one trend response management solves. Some implementations of trend response management techniques can employ at least two different approaches. The trend response management techniques can update users 'actively' or 'passively'. Two active strategies are described first below, followed by passive strategies.

In a first active strategy, trend response management techniques can identify loyal users of the search engine since loyal users are more likely to come back and search for the trending topics. In one implementation, loyal users can be defined as users that had submitted a large number of queries in the past, and they had also searched for at least one more trending event in the past. Stated another way, an active strategy may define a first subset of the active users defined as having submitted at least a predefined number of search queries over a period of time. For instance active users in the first set may have submitted at least 50 queries in the last week, for example.

The second active strategy that can be employed by the trend response management techniques is to identify to whom to push the trending search content based on the assumption that users who recently submitted a search query in the search engine will most probably search for the trending content as soon as they find out. Stated another way, the second subset of the active users can be defined as having submitted at least one search query within a predefined time (such as one hour) before the detecting. Other implementations may inversely weight the elapsed time since the user last submitted an unrelated search query. For instance, a user that submitted a search query five minutes before the trend was detected may be more likely to search for the trend than a user that last submitted a search query three hours previously. Thus, content may be pushed to the more recent user before the more distant user.

Active updates tend to require the datacenter to track individual users and preemptively push the trending search content to them when it becomes available. Such an approach, however, can lead to pushing content to large numbers of users out of which only a few might eventually search it. Given that, if not highly accurate, active pushing can further stress the datacenter, some implementations can alternatively or additionally employ passive, opportunistic updates. In particular, each time a user submits a query to the search engine and a trending search topic is currently active, the trend response management component can operate cooperatively with the search engine to opportunistically update the user with the latest trending search content along with providing the search results to the (non-trend-related) query. In that way, no extra requests need to be submitted to the datacenter and no user-tracking is required.

The described methods can be performed by the systems and/or devices described above relative to FIGS. 2-4, and/or by other devices and/or systems. The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on computer-readable storage media as a set of instructions such that execution by a processor of a computing device causes the computing device to perform the method.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method performed by one or more computing devices, the method comprising:
comparing current numbers of submissions of keywords in recent search queries to previous numbers of submissions of the keywords in previous search queries submitted during a reference time period;
based at least on the current numbers and the previous numbers, designating certain keywords as trending keywords;
identifying a trending topic associated with a subset of the recent search queries that include at least some of the trending keywords;
identifying selected search results that were returned to the subset of the recent search queries and selected by users;
identifying other recent search queries that are also associated with the trending topic but not included in the subset of the recent search queries that include the trending keywords, the other recent search queries being identified by detecting that the other recent search queries also return the selected search results; and
creating a dataset for the trending topic that includes the subset of the recent search queries mapped to the selected search results and the other recent search queries mapped to the selected search results.

2. The method of claim 1, wherein the identifying the trending topic comprises:
distinguishing a subset of the trending keywords that tend to be co-located in the recent search queries;
determining the trending topic from the subset of the trending keywords; and
detecting the subset of the recent search queries that relate to the trending topic based at least upon the subset of the trending keywords.

3. The method of claim 1, further comprising:
picking individual users to send the dataset to who have not already searched for the trending topic but have recently submitted unrelated search queries; and
sending the dataset to the individual users together with other search results for the unrelated search queries.

4. The method of claim 1, wherein the one or more computing devices comprise server computing devices that also provide a search engine functionality.

5. A system comprising:
one or more processors; and
one or more computer-readable storage media having computer-executable instructions stored thereon that, when executed by the one or more processors, cause the one or more processors to:
detect a trending topic;
identify content associated with the trending topic;
identify active users that have not queried on the trending topic but have engaged in query activity with respect to at least one topic other than the trending topic; and
responsive to the query activity by the active users with respect to the at least one topic other than the trending topic, send the content associated with the trending topic to the active users.

6. The system of claim 5, wherein the content sent to the active users comprises trending queries submitted by other users and uniform resource locators (URLs) returned to the other users and selected by the other users.

7. The system of claim 6, wherein the computer-executable instructions, when executed by the one or more processors, cause the one or more processors to:
hash the content into a trending content hash table that references the trending queries to search results; and
send the trending content hash table to the specific set of active users.

8. The system of claim 7, wherein the computer-executable instructions, when executed by the one or more processors, cause the one or more processors to:
compress the trending content hash table and send the compressed trending content hash table to the active users.

9. The system of claim 5, wherein the computer-executable instructions, when executed by the one or more processors, cause the one or more processors to:
identify a first subset of the active users that have submitted at least a predefined number of search queries unrelated to the trending topic over a period of time;
identify a second subset of the active users that have submitted at least one search query unrelated to the trending topic within a predefined time before the trending topic is detected; and
send the content associated with the trending topic to both the first subset and the second subset.

10. The system of claim 5, wherein the computer-executable instructions, when executed by the one or more processors, cause the one or more processors to:
- determine that an individual user has submitted a search query unrelated to the trending topic;
- obtain search results for the search query that is unrelated to the trending topic; and
- send the content associated with the trending topic to the individual user together with the search results for the search query that is unrelated to the trending topic.

11. The system of claim 10, wherein the individual user is one of the active users.

12. The system of claim 5, wherein the computer-executable instructions, when executed by the one or more processors, cause the one or more processors to:
- compare the content to profiles of the active users to determine likelihoods that individual active users are interested in the trending topic; and
- push the content to certain individual users having corresponding likelihoods that exceed a threshold.

13. A device, comprising:
- a display;
- one or more processors; and
- storage storing computer-readable instructions which, when executed by the one or more processors, cause the one or more processors to:
- receive a user search query that is unrelated to a trending topic;
- send the user search query that is unrelated to the trending topic to a remote service;
- obtain, from the remote service, search results for the user search query that is unrelated to the trending topic and a trending content search index relating to a trending search topic, the trending content search index being sent to the device by the remote service responsive to receiving the user search query that is unrelated to the trending topic;
- store the trending content search index on the storage;
- receive a subsequent search query from the user relating to the trending search topic;
- retrieve other search results for the subsequent search query relating to the trending search topic from the trending content search index stored on the storage; and
- present the other search results for the subsequent search query on the display.

14. The device of claim 13, wherein the computer-readable instructions, when executed by the one or more processors, cause the one or more processors to:
- retrieve the other search results from the storage rather than sending the subsequent search query to the remote service.

15. The device of claim 13, wherein the trending content search index maps queries related to the trending search topic to search results relating to the trending search topic.

16. The device of claim 13, wherein the trending content search index includes search queries relating to the trending search topic and links to websites relating to the search queries.

17. The device of claim 16, wherein the trending content search index further includes content from the websites.

18. The device of claim 13, wherein the trending content search index comprises a hash table.

19. The device of claim 13, wherein the computer-readable instructions are manifest as a web-content application that is stored on the device.

20. The device of claim 19, wherein the web-content application includes a search engine and a trend response management component that are cooperatively configured to search the trending content search index on the device before accessing the remote service.

* * * * *